US010237442B2

(12) United States Patent
Chapman et al.

(10) Patent No.: US 10,237,442 B2
(45) Date of Patent: Mar. 19, 2019

(54) SECURITY MARK WITH ANTI-COPYABLE EFFECT

(71) Applicant: Xerox Corporation, Norwalk, CT (US)

(72) Inventors: Edward N. Chapman, Rochester, NY (US); Reiner Eschbach, Webster, NY (US); Judith E. Stinehour, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 85 days.

(21) Appl. No.: 14/528,126

(22) Filed: Oct. 30, 2014

(65) Prior Publication Data

US 2016/0127603 A1 May 5, 2016

(51) Int. Cl.
*H04N 1/32* (2006.01)
*B42D 25/485* (2014.01)
*H04N 1/00* (2006.01)
*B42D 25/30* (2014.01)
*B41M 3/14* (2006.01)

(52) U.S. Cl.
CPC ......... *H04N 1/32331* (2013.01); *B42D 25/30* (2014.10); *B42D 25/485* (2014.10); *H04N 1/0088* (2013.01); *H04N 1/00846* (2013.01); *H04N 1/00864* (2013.01); *H04N 1/00883* (2013.01); *B41M 3/14* (2013.01); *H04N 2201/3236* (2013.01); *H04N 2201/3271* (2013.01)

(58) Field of Classification Search
CPC ................................ B42D 15/00; B42D 15/10
USPC .................. 283/72, 93, 94, 98, 901, 902
See application file for complete search history.

(56) References Cited

U.S. PATENT DOCUMENTS

| 5,734,752 | A | 3/1998 | Knox |
| 5,790,703 | A | 8/1998 | Wang |
| 5,873,604 | A * | 2/1999 | Phillips .................. B42D 25/29 283/58 |
| 6,108,512 | A | 8/2000 | Hanna |
| 6,252,971 | B1 | 6/2001 | Wang |
| 6,886,863 | B1 * | 5/2005 | Mowry, Jr. ............ B42D 25/29 283/72 |
| 7,126,721 | B2 | 10/2006 | Wang et al. |
| 7,301,675 | B2 | 11/2007 | Wang et al. |
| 7,352,879 | B2 | 4/2008 | Wang |
| 7,580,153 | B2 | 8/2009 | Eschbach et al. |
| 7,589,865 | B2 | 9/2009 | Eschbach et al. |
| 7,589,895 | B2 | 9/2009 | Okada et al. |
| 7,869,090 | B2 | 1/2011 | Wang et al. |
| 7,894,626 | B2 | 2/2011 | Wang et al. |
| 8,233,197 | B2 | 7/2012 | Wang et al. |
| 8,259,361 | B2 | 9/2012 | Morales et al. |
| 8,310,718 | B2 | 11/2012 | Chapman et al. |
| 8,342,576 | B2 | 1/2013 | Eschbach et al. |

(Continued)

FOREIGN PATENT DOCUMENTS

| EP | 2230828 A2 | 9/2010 |
| EP | 2783878 A1 * | 10/2014 ......... G06K 15/1867 |

*Primary Examiner* — Justin V Lewis
(74) *Attorney, Agent, or Firm* — Fox Rothschild LLP

(57) ABSTRACT

A document contains a security element that combines a correlation mark and pantograph mark. The pantograph mark includes a dot pattern, part of which is printed to correspond to foreground pixels of the correlation mark, and another part of which is printed to correspond to background pixels of the correlation mark.

9 Claims, 7 Drawing Sheets

(56) References Cited

U.S. PATENT DOCUMENTS

2007/0139681 A1* 6/2007 Eschbach ............... G06K 15/02
                                                    358/1.11
2010/0150433 A1* 6/2010 Wang ................. H04N 1/00864
                                                    382/162
2013/0272523 A1   10/2013 McCorkindale et al.

* cited by examiner

SECURITY MARK WITH ANTI-COPYABLE EFFECT

BACKGROUND

Security is an important requirement in many document printing applications. In situations such as official or government document printing, event ticket printing, financial instrument printing and the like, many printed documents must be protected against copying, forging and/or counterfeiting.

One example of such a document is a prescription for medication. Upon receipt of a printed prescription, the pharmacist would like to have a good level of confidence that the document is genuine and is being used only once, by the person to which the prescription was issued. In applications such as this it is important that the document have a security feature that is difficult or impossible to copy, so that a single, valid, original prescription document is not used to create counterfeit copies that also contain the security feature. A security mark that does not survive reproduction is commonly called "fragile."

Another example document is a confidential company customer list. In this situation, the document's creator may be concerned about the document falling into unauthorized hands and being altered. Thus, in a situation such as this, it is important that the security mark survive reproduction and distribution so that the document can tracked and/or the security mark decoded. A mark that does survive reproduction is commonly called "robust."

A correlation mark is an example of a security mark that is typically robust. A correlation mark includes one or more elements that are invisible or hardly visible on a printed document. The hidden elements become visible when the document is viewed through a correlation mask that serves as a "key" to the correlation mark.

Security markings that are fragile often require special printing materials, which can increase their costs. Accordingly, the inventors have found to be desirable to provide a security mark that includes elements of a correlation mark, but which also contains fragile components.

This document describes methods and systems for creating and using a security mark that addresses at least some of the problems described above, and/or other problems.

SUMMARY

In an embodiment, a system for printing a secure document includes a processor, a computer-readable medium containing programming instructions, and a print device. The system implements the instructions to develop a rule set for printing a secure document that includes a combined mark security element. The process includes identifying a first set of instructions for printing a correlation mark component on a substrate, so that the correlation mark component includes foreground pixels and background pixels. The process also includes identifying a second set of instructions for printing a pantograph component on the substrate. The pantograph component includes a first pattern of dots and a second pattern of dots. The process also includes: creating a mask for printing the correlation mark component on the substrate and the first pattern of dots within a frame; identifying a second set of instructions for printing the second pattern of dots on the substrate within the frame; and saving the rule set to a memory as a computer-readable file. The printing device may then print the combined mark security element on the substrate within the frame.

Optionally, when creating the mask for printing the correlation mark component on the substrate as the first pattern of dots within a frame, the system may map one or more instances of the correlation mark component to one or more instances of the pantograph mark component to yield the combined mark so that: (i) a first portion of the correlation mark component will be printed where the first pattern of dots will appear on the substrate; and (ii) a second portion of the correlation mark component will be printed where the second pattern of dots will appear on the substrate.

Optionally, the system may select a first color for the correlation mark component, and it may select a second color for the pantograph component so that the second color is visually indistinguishable from the first color. The instructions will include the first color and the second color, and the mark will be printed in accordance with the instructions.

In some embodiments, the correlation mark component may include a lighter portion and a darker portion. Examples include white and black, white and gray, or a lighter grayscale and a darker grayscale. When preparing instructions to print the correlation mark component on the substrate and the first pattern of dots within the frame, the system may generate the first pattern of dots so that it has a frequency that is substantially the same as a frequency of the correlation mark component, and so that the first pattern of dots exhibits an angle that is substantially similar to an angle of the correlation mark components. Thus, in areas that do not correspond to text of the security element, most or substantially all of the dots in the first pattern of dots appear over the darker portion of the correlation mark component. In addition, in areas that do correspond to text of the security element, most or substantially all of the dots in the first pattern of dots will appear over the lighter portion of the correlation mark component. In some embodiments, this configuration may be reversed.

In another embodiment, a secure document includes a substrate containing printed material imprinted thereon. The printed material includes secure content and non-secure content. The secure content includes a security mark having a frame within which a combination of a correlation mark and pantograph mark are printed. The frame contains foreground pixels of the correlation mark in a toner of a first color, and pixels of the pantograph mark in a toner of a second color. The first color is distinct from a color of an area of the substrate on which background pixels of the correlation mark appear. The second color is visually indistinguishable from the first color when viewed without the assistance of any device. A first portion of the pantograph mark pixels are located over positions where foreground pixels of the correlation mark appear, and a second portion of the pantograph mark pixels are located over positions where background pixels of the correlation mark appear.

DETAILED DESCRIPTION

Figure 1A:
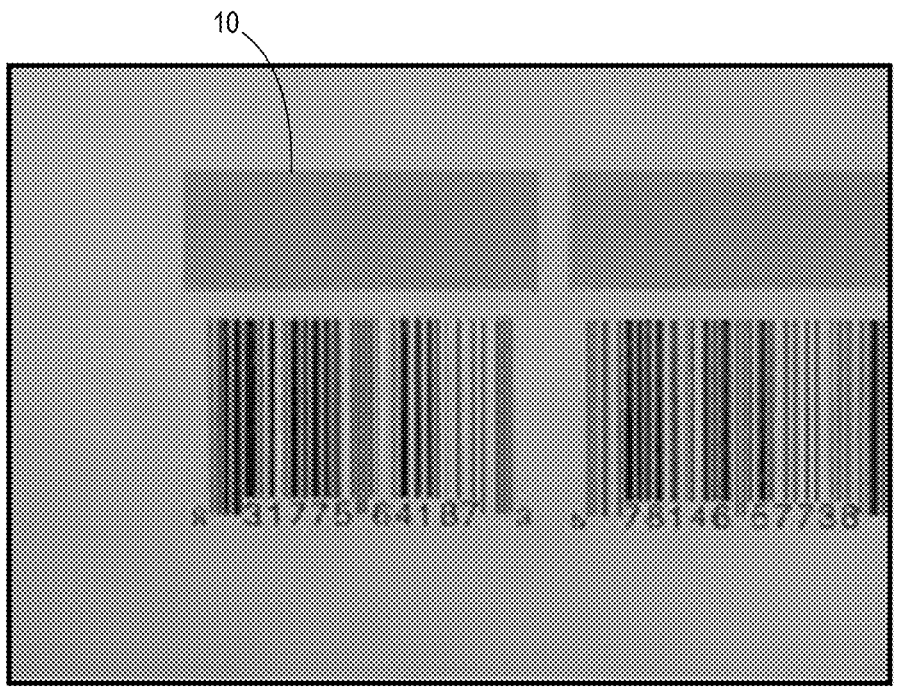
FIGS. 1A and 1B illustrate an example of a printed correlation mark such as may be found in the prior art, along with the use of a correlation mask to decode the mark.

This disclosure is not limited to the particular systems, devices and methods described, as these may vary. The terminology used in the description is for the purpose of describing the particular versions or embodiments only, and is not intended to limit the scope.

As used in this document, the singular forms of any word, and defining adjectives such as "a," "an" and "the," each include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "security mark" refers to a marking made on a document that can be used to verify the authenticity of the document, and thus may help prevent counterfeiting or unauthorized duplication of the document. Examples of such marks include those known as correlation marks and variable data pantograph marks, each of which will be described in more detail below. A "frame" refers to the boundary of a security mark.

A "computing device" or "electronic device" is a device that includes a processor and non-transitory computer-readable memory. The memory contains programming instructions in the form of a software application that, when executed by the processor, causes the device to perform various operations according to the programming instructions. Examples of electronic devices include computers, servers, smartphones, personal digital assistants, cameras, tablet devices, electronic readers, personal computers, media players, satellite navigation devices and the like.

The terms "memory" and "computer-readable medium" each refer to a non-transitory device on which computer-readable data, programming instructions or both are stored. Unless the context specifically states that a single device is required or that multiple devices are required, the terms "memory" and "computer-readable medium" include both the singular and plural embodiments, as well as portions of such devices such as memory sectors.

A "print device" is an electronic device that is capable of receiving commands and/or data, and in response printing characters and/or images on a substrate. Printing devices may include, but are not limited to, network printers, production printers, copiers and other devices using ink or toner, and scanners. A print device may also perform a combination of functions such as printing and scanning, in which case such a device may be considered a multifunction device.

A "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

Watermarks are security elements that can provide for the authentication or tracking of documents. For example, American currency carries a watermark that can be observed under the correct viewing conditions. In particular, if one holds a current $5 or greater American bill up to a light, a watermark bearing the image of the person whose portrait is on the bill will be revealed. The watermark helps prevent counterfeiting because it represents a technological hurdle for counterfeiters. As such, the watermark helps authenticate the currency.

A correlation mark is a type of digital watermark containing one or more elements that are invisible or hardly visible on a printed document. These hidden elements become visible when the document is viewed through a correlation mask that serves as a "key" to the correlation mark. An example of a correlation mark is taught in U.S. Pat. No. 5,734,752 to Knox, titled "Digital watermarking using stochastic screen patterns," the disclosure of which is incorporated herein by reference in its entirety. Correlation marks typically require no special materials for the printing process. A correlation mark is typically robust, and can be copied by typical duplication methods.

Correlation marks can be detected either by scanning or capturing an image of a document containing the mark and processing the scanned/captured image, or by overlaying a transparency containing a "key" on top of the document to reveal the hidden watermark. A pattern printed onto a transparency is an example of such a transparency, which may be referred to as a correlation mask. The pattern in the mask may be a stochastic screen that corresponds to pixel elements of mark. Aligning the correlation mask to the printed document or image causes a correlation image to become visible.

To generate a correlation mark, the system may retrieve and/or print a stochastic screen pattern for the mark that is stored in a memory. Or, the system may generate a correlation mark by producing a first stochastic screen pattern for the mark, and a second stochastic screen pattern for the correlation mask, using methods such as those described in U.S. Pat. No. 5,734,752. When generating or printing the correlation mark, all foreground pixels of the mark may have the same or similar grayscale values. Alternatively, the foreground pixels of the mark may be of different colors, with pixels of the hidden image being of one grayscale or RGB value, and other pixels of the mark exhibiting one or more other grayscale or RGB values. In this document, the term "foreground pixel" refers to a pixel of the correlation mark that will, when printed on a substrate or displayed on a display, appear as a dark element. In the context of a correlation mark, this may mean that the pixel represents either the hidden security element or the visible text box that surrounds the hidden security element. In comparison, a "background pixel" will be one that appears as white or a color that is visibly different from that of the foreground pixels.

Figure 1B:
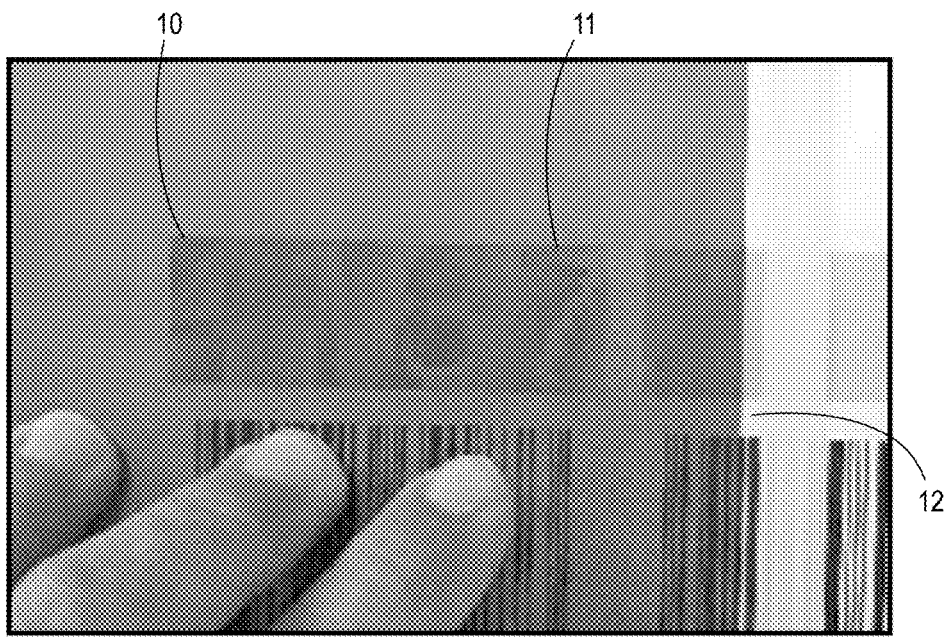

An example of a how a correlation mark may be decoded in accordance with the prior art is shown in FIGS. 1A and 1B. FIG. 1A shows an example of a printed correlation mark 10, in which the watermark is hidden text that is encoded in the mark. FIG. 1B illustrates that when a user places a correlation mask 12 over the correlation mark 10, the hidden text 11 is revealed through the mask. Correlation marks are typically considered to be robust marks, as they will survive normal photocopying and will be rendered on a photocopied document.

Figure 2:
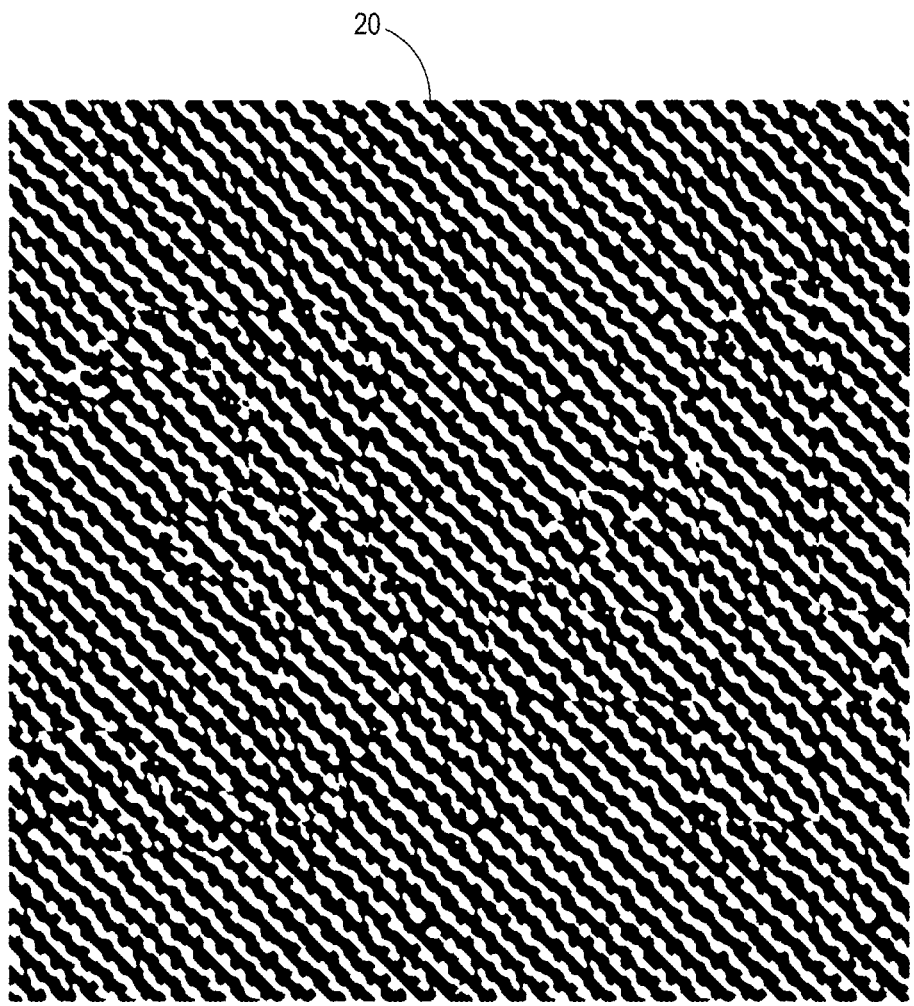
FIG. 2 is a large scale example of a correlation mark of the prior art.

FIG. 2 shows an enlarged example of a correlation mark 20 in accordance with the prior art. In this magnification, one who studies the mark closely may see the outlines of a mark containing the hidden characters "34." Typically, a correlation mark such as this would be printed in a small size (such as a thumbnail between about ¼ inch in height and about 1 inch in height, although other sizes are possible). Because of the size and halftone patterns, the mark will appear to the human eye as substantially a constant gray pattern, and the hidden characters will not be visible without the use of a key. Note that while the mark 20 of FIG. 2 is printed as 100% black and white for the purpose of this illustration, it may be printed in shades of gray or color.

Another type of security mark is that known as a pantograph, which may be created using a process known as variable data pantograph printing or void pantograph printing. An example of this is described in U.S. Pat. No. 4,210,346 to Mowry et al., titled "Protected Document Bearing Watermark and Method of Making," the disclosure of which is incorporated herein by reference in its entirety. As described in the '346 patent, a mark may be formed as a pattern of dots of varying sizes printed on a substrate. The dots will be substantially fine (i.e., of small size) and interspersed with other material printed on the substrate such that the overall pattern of the variable data pantograph mark is not readily discernable to the human eye.

Figure 3:
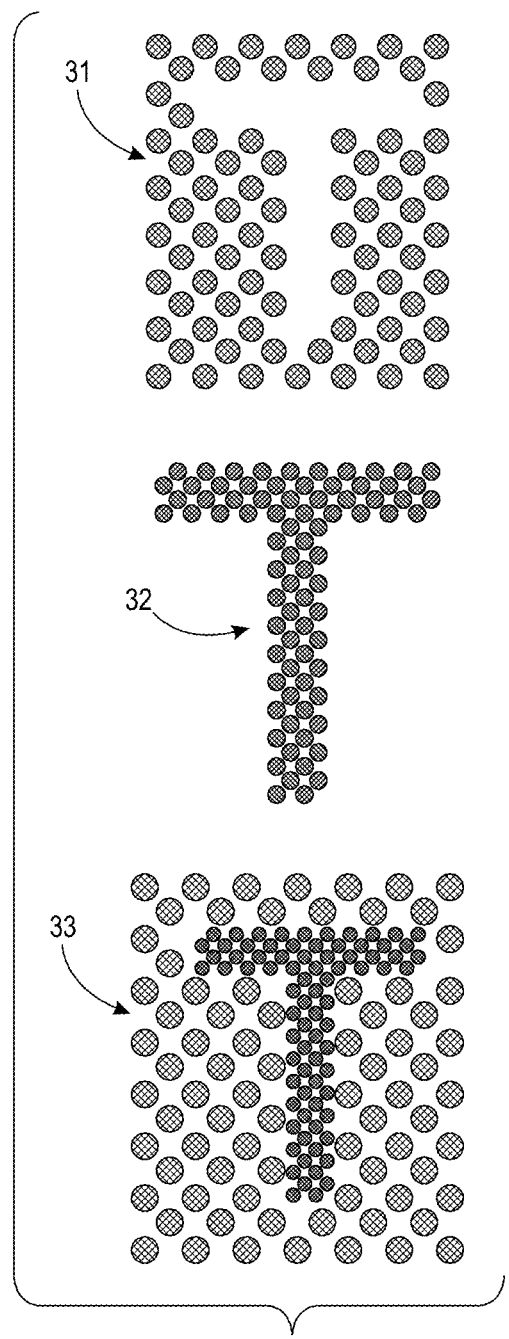
FIG. 3 is an example of a pantograph and its components in accordance with the prior art.
Figure 4:
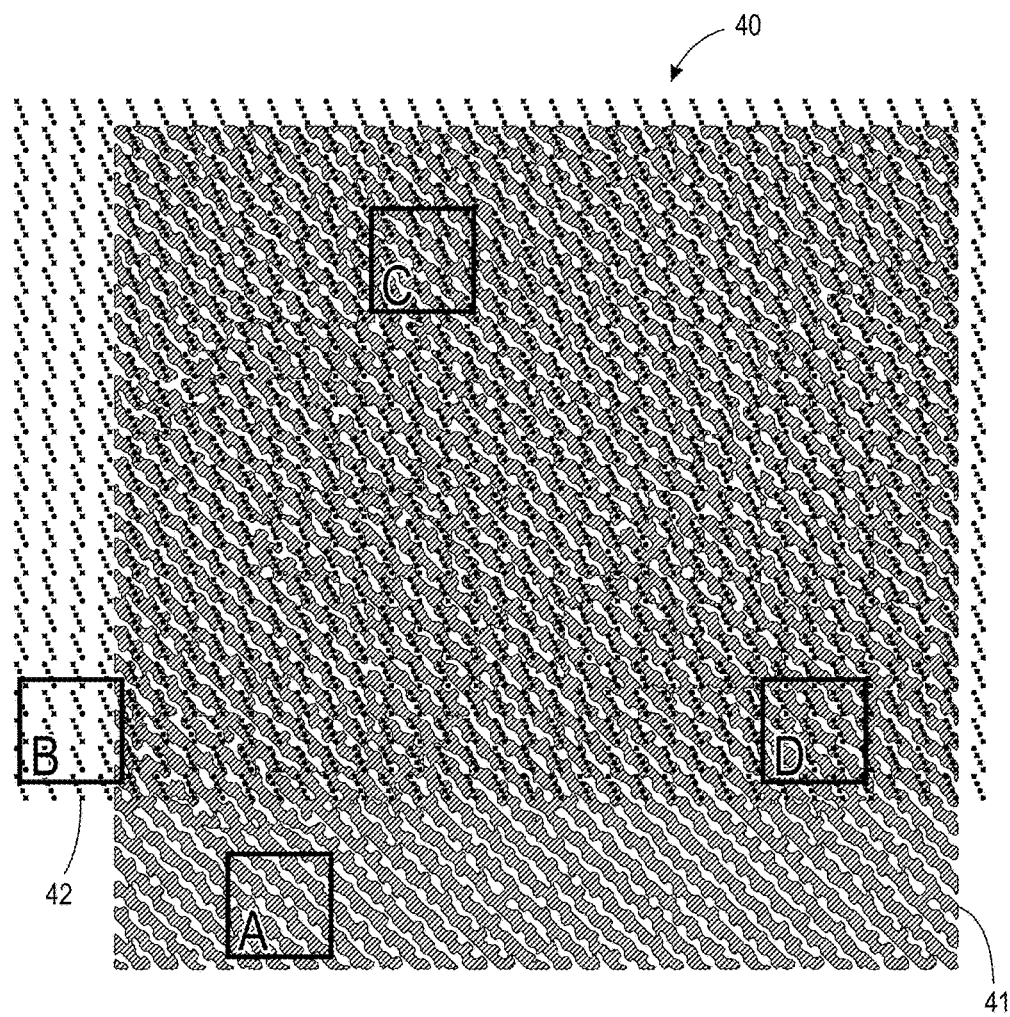
FIG. 4 illustrates an example of a modified security mark in accordance with the embodiments of this document.

Another example of this is described in U.S. Pat. No. 7,869,090, to Wang et al., titled "Variable Data Digital Pantographs" (the "'090 patent"), the disclosure of which is incorporated herein by reference in its entirety. As described in the '090 patent, a mark may be formed as a pattern of dots of at least two sizes printed on a substrate. Each of the two sizes may have the same tone, or they may have similar but not identical tones. By varying the size and/or tone of the two classes of dots, one class may be used as a background and the other class may be used to present a foreground message in the mark. For example, as shown in FIG. 3, a background font 31 made up of a set of a first pattern of dots and a foreground font 31 made up of a different pattern of dots may be superimposed on each other to create a pantograph 33—in this case, a layered font. In accordance with the present embodiments, a correlation mark may be used as one of the fonts (i.e., one of the sets of the patterned dots) of a pantograph to provide a security mark with anti-copyable elements. FIG. 4 illustrates an example of such a mark 40. In FIG. 4, boxes A, B, C and D are not part of the mark but instead as used to illustrate various characteristics of the combined security mark. The mark 40 includes a first component 41 that corresponds to a correlation mark as well as one font of a pantograph, and a second component 42 that corresponds to the second font of the void pantograph or variable data pantograph mark. While FIG. 4 shows the first and second components as misaligned for the purpose of making them easier to discern for the purpose of this discussion, in practice the two components may be aligned and contained within a common border. The invention is intended to encompass both aligned and misaligned embodiments.

In FIG. 4, box A highlights an area containing only the correlation mark component 41 (i.e., the first font of the pantograph), while box B highlights an area containing only the pantograph mark's second font component 42. As described above, a correlation mark component 41 will typically contain darker foreground pixels and lighter background pixels. In FIG. 4, box C illustrates that in some areas, the overlay of the pantograph mark component 42 on the correlation mark component 41 may result in the foreground (darker) pixels of the correlation mark being printed to form the corresponding dot pattern of the pantograph mar. Box D illustrates that in some areas, the overlay of the pantograph mark component 42 on the correlation mark component 41 may result in the dot pattern of the pantograph mark being printed primarily over the background (lighter) pixels of the correlation mark. (As used in this context, the term "over" means that the two components are printed in the same location, not necessarily that one component is printed first. In other words, a pantograph mark component could be printed under the correlation mark component or concurrently with the correlation mark component and still be considered "over" the correlation mark component for the purpose of this discussion.) In this way, the correlation mark and the pantograph are made more difficult to print since the correlation mark's white space is partially filled by the dot pattern of the pantograph mark.

The colors of the components of each mark that are printed over each other will be substantially similar, so that they are usually indistinguishable to a typical human observer who views the combined mark with the unaided human eye. The system may select these colors automatically, randomly or by using default colors or selections that are responsive to selections of a human designer.

Figure 5:
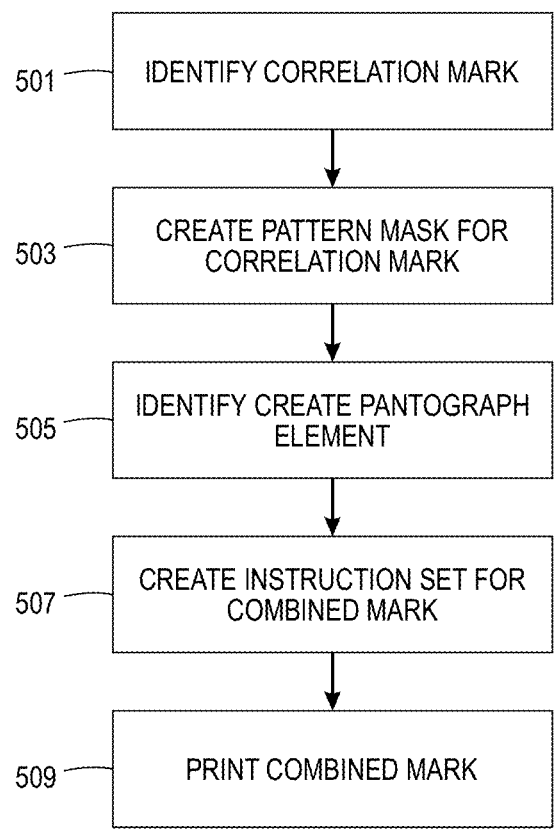
FIG. 5 is a flow diagram illustrating a process of creating a security mark.

FIG. 5 illustrates a process by which a printing system may create a security mark such as that described above. The system may first identify or create a correlation mark (step 501), including the positions of its foreground and background pixels. The system may then create a pattern mask (step 503) to indicate where the variable data elements of the correlation mark will appear on the substrate. Any now or hereafter known mask design may be used, such as those that are used in page description languages such as PostScript™. The system also may identify or create instructions a pantograph security element on the substrate (step 505), where the pantograph security element includes a pattern of dots.

To combine the correlation mark with a pantograph mark, the system will map the pantograph mark to the correlation mark to define a mask that will contain elements of both the pantograph mark and the correlation mark (step 507). For example, referring back to FIG. 4, the system may identify a correlation mark component 41 with a known or defined period (i.e., the distance between the light and dark stripes is constant). The correlation mark component 41 also has a defined or known angle. The second font component 42 will have the same (or substantially the same) frequency as the first font component 41. Also, the system will select an angle for the second font component 42 that is close enough to the angle of the correlation mark component 41 so that most (or substantially all) of the dots of the second component 42 fit over the darker area of the correlation mark component 41 when on the text, and mostly on the lighter areas of correlation mark component 41 where text should not appear. (Alternatively, this configuration may be reversed.) Thus, the combined mark has a substantially constant gray level so that the text only appears when copied or viewed with a screen.

The system uses the mask to define a frame for the combined mark as a print file or set of instructions that cause the some of the dots of the pantograph mark to print in positions of the substrate that correspond to background pixels of the correlation mark, while other dots of the pantograph mark print in positions that correspond to foreground pixels of the correlation mark. For example, the system may develop instructions to print the correlation mark component 41 and then the pantograph mark's second font component 42, or vice versa. The system may then develop instructions for printing the first component of the pantograph in the frame. Returning to FIG. 5, it will then instruct a printing device to print the combined mark on the substrate (step 509).

Figure 6:
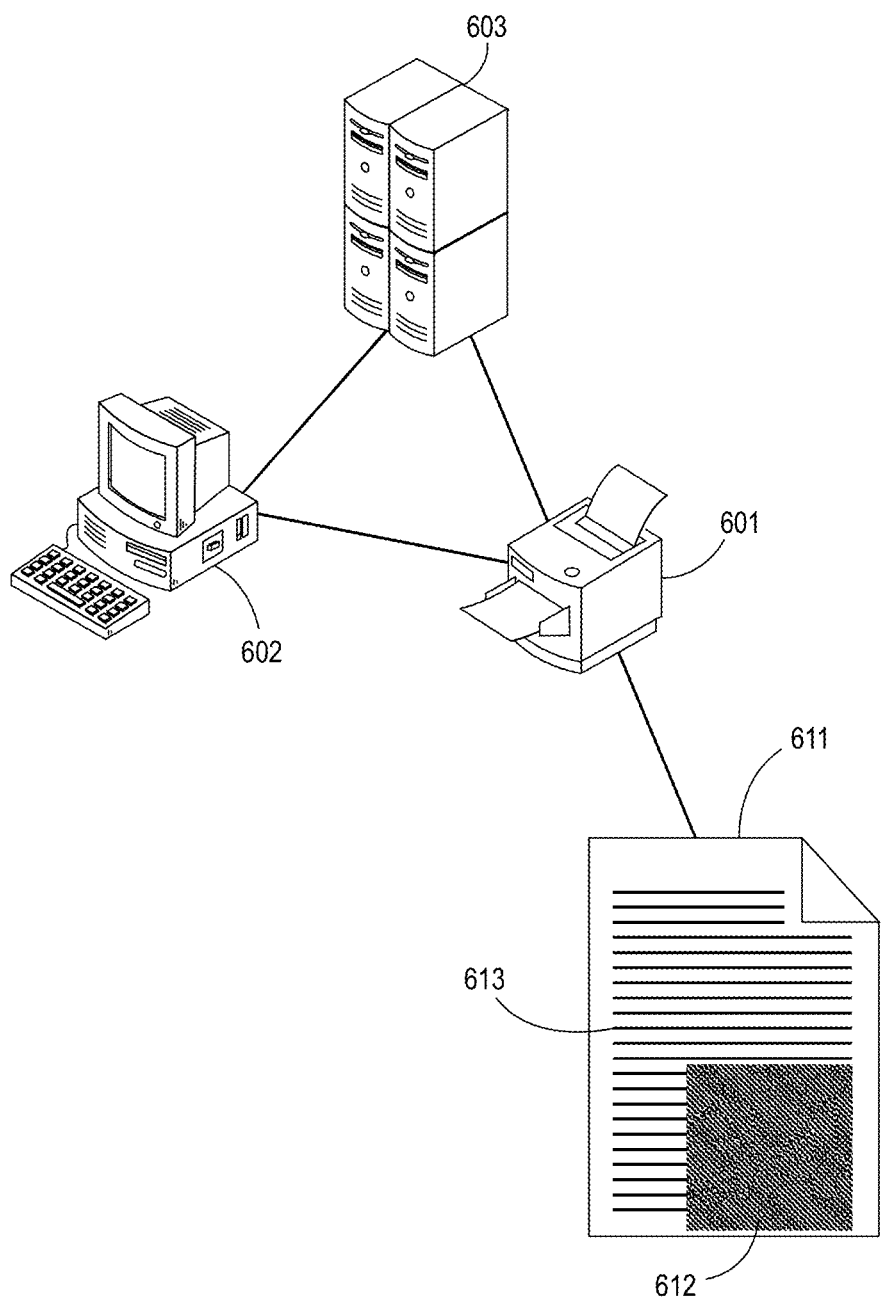
FIG. 6 is a diagram illustrating various elements of a system that may print a security mark.

FIG. 6 illustrates the basic elements of a system that may be used to create and/or print a security mark such as that described above. The system includes a print device 601 that includes supply chambers for ink or toner and a print head that can apply the ink or toner to a substrate to create a marking. The print device 601 may include a processor and memory with programming instructions that cause the printer to receive data from an external source and process the data perform various print-related functions. (Such instructions may be known to those of skill in the art as a "digital front end".) In addition or alternatively, the print device 601 may be in wired or wireless electronic communication with one or more computing devices 602 that include a processor and computer-readable medium with an installed print driver that provides instructions, data or both to the printer. In addition or alternatively, the print device 601 and/or printer may be in wired or wireless electronic communication with one or more remote servers 603 that include a processor and computer-readable medium that is configured to send instructions, data or both to the printer or the computing device.

In operation, the printer 601 will print a document 611 that contains characters, images or other non-secure content 613 that is visible to an ordinary viewer, along with a security mark 612 created in accordance with the methods described below. The security mark 612 shown in FIG. 6 is merely an example, and it may be any mark that exhibits the components described above.

Figure 7:
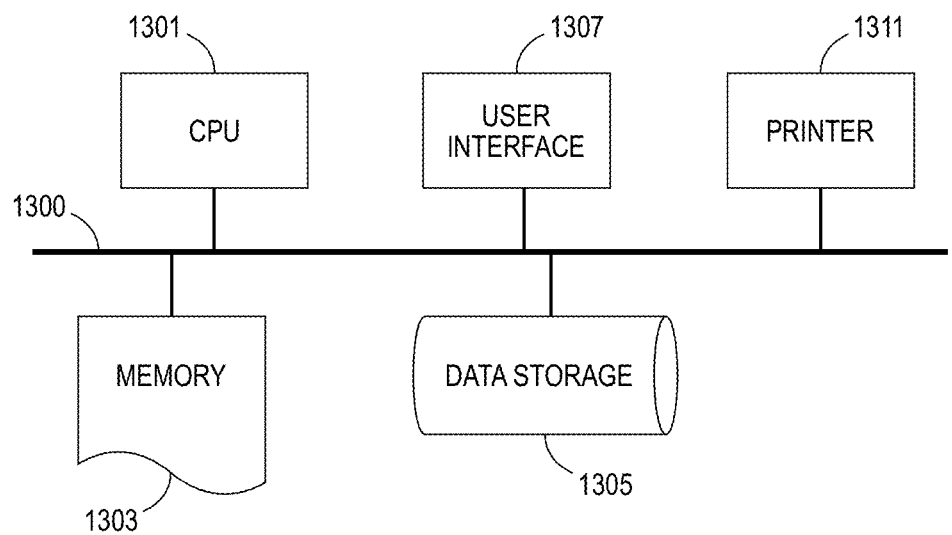
FIG. 7 is a block diagram showing various equipment that may be used to implement various embodiments of the processes described in this document.

FIG. 7 depicts a block diagram of hardware and/or electronics that may make up a system that modifies the mark elements, develops instructions for printing a security mark, and prints the security mark. One or more communications lines 1300 such as a bus (for a single device) or network (for multiple devices) may interconnect the illustrated components and allow data and/or signals to flow between the components. CPU 1301 represents one or more processors that performs calculations and logic operations required to execute a program. Any number of processors may be available, and they may be part of a single electronic device or distributed across any number of networked electronic devices. When this document and its claims uses the term "processor," unless specifically stated otherwise it is intended to refer to all such embodiments (i.e., single processor or multiple processors). The processor(s) may access a computer-readable memory device 1303 containing programming instructions, along with a data storage facility 1305 such as a database that stores the package generation templates and/or rule sets.

A user interface 1307 is a device or system that provides output to, and receives input from, a user. The user interface may include a display, audio output, a printer, or another element that provides information to a user. The user interface 1307 also may include a touch-sensitive component, microphone, audio port, keyboard, mouse, touch pad, or other input mechanism that is capable of receiving user input. The system also may include one or more printing devices 1311, each of which contains hardware that enables it to print marks on a substrate. The printing device(s) may, individually or collectively, contain toner reservoirs with non-gloss toner that is suitable for a correlation mark. As used in this document, the term "reservoir" means any structure that holds toner, which may be in liquid, solid, gel, or other form.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for printing a secure document, comprising:
a processor;
a printing device; and
a computer-readable medium containing programming instructions that, when executed by the processor, cause the printing device to print a combined mark security element on a substrate by:
selecting a first color,
selecting a second color so that the second color is visually indistinguishable from the first color,
using the first color, printing a correlation mark component comprising a lighter portion and a darker portion on a substrate within a frame,
using the second color, printing a pantograph mark component comprising a first pattern of dots and a second pattern of dots on the substrate within the frame by generating the first pattern of dots so that:
the first pattern of dots has a frequency that is substantially the same as a frequency of the correlation mark component, and
the first pattern of dots exhibits an angle that is substantially similar to an angle of the correlation mark component so that most of the dots in the first pattern of dots appear over the darker portion of the correlation mark component in areas that do not correspond to text of the combined mark security element.

2. The system of claim 1, wherein the instructions for printing the correlation mark component on the substrate and the first pattern of dots within the frame comprise instructions to map one or more instances of the correlation mark component to one or more instances of the pantograph mark component to yield the combined mark security element so that:
a first portion of the correlation mark component will be printed where the first pattern of dots will appear on the substrate; and
a second portion of the correlation mark component will be printed where the second pattern of dots will appear on the substrate.

3. The system of claim 1, wherein the instructions for printing the correlation mark component also comprise instructions to generate the first pattern of dots so that the first pattern of dots exhibits an angle in which most of the dots in the first pattern of dots appear over the lighter portion of the correlation mark component in areas that do correspond to text of the security element.

4. The system of claim 1, wherein the programming instructions that cause the printing device to print the combined mark security element on the substrate comprise instructions to print the combined mark security element within a thumbnail size that is between about ¼ inch in height and about 1 inch in height.

5. The system of claim 4, wherein the instructions for printing the correlation mark component on the substrate and the first pattern of dots within the frame comprise instructions to map one or more instances of the correlation mark component to one or more instances of the pantograph mark component to yield the combined mark security element so that:

a first portion of the correlation mark component will be printed where the first pattern of dots will appear on the substrate; and a second portion of the correlation mark component will be printed where the second pattern of dots will appear on the substrate.

6. A secure document, comprising:

a substrate containing printed material imprinted thereon, wherein the printed material comprises secure content and non-secure content, wherein the secure content comprises a security mark that comprises a combination of a correlation mark and a pantograph mark, the security mark comprising:

foreground pixels of the correlation mark in a toner of a first color, wherein the first color is distinct from a color of an area of the substrate on which background pixels of the correlation mark appear, and the correlation mark comprises a lighter portion and a darker portion; and pixels of the pantograph mark in a toner of a second color, wherein:

a first portion of the pixels of the pantograph mark are located over positions where foreground pixels of the correlation mark appear, a second portion of the pixels of the pantograph mark are located over positions where background pixels of the correlation mark appear, the second color is visually indistinguishable from the first color when viewed without the assistance of a mask screen, the pantograph mark comprises a first pattern of dots and a second pattern of dots, the first pattern of dots has a frequency that is substantially the same as a frequency of the correlation mark, and the first pattern of dots exhibits an angle that is substantially similar to an angle of pixels of the correlation mark so that most of the dots in the first pattern of dots appear over the darker portion of the correlation mark in areas that do not correspond to text of the security mark, and the first pattern of dots also exhibits an angle in which most of the dots in the first pattern of dots appear over the lighter portion of the correlation mark in areas that do correspond to text of the security element.

7. The secure document of claim 6, wherein the security mark exhibits a thumbnail size that is between about ¼ inch in height and about 1 inch in height.

8. A system for printing a secure document, comprising:
a processor;
a printing device; and
a computer-readable medium containing programming instructions that, when executed by the processor, cause the printing device to print a combined mark security element on a substrate by:

printing a correlation mark component comprising a lighter portion and a darker portion on a substrate within a frame, and printing a pantograph mark component comprising a first pattern of dots and a second pattern of dots on the substrate and within the frame by generating the first pattern of dots so that:

the first pattern of dots has a frequency that is substantially the same as a frequency of the correlation mark component, the first pattern of dots exhibits an angle that is substantially similar to an angle of the correlation mark component so that most of the dots in the first pattern of dots appear over the darker portion of the correlation mark component in areas that do not correspond to text of the combined mark security element, and the first pattern of dots also exhibits an angle in which most of the dots in the first pattern of dots appear over the lighter portion of the correlation mark component in areas that do correspond to text of the security element.

9. The system of claim 8, wherein the programming instructions that cause the printing device to print the combined mark security element on the substrate comprise instructions to print the combined mark security element within a thumbnail size that is between about ¼ inch in height and about 1 inch in height.

* * * * *